March 30, 1965 MASAO KAWASHIMA ETAL 3,176,162

HIGH-SPEED LINEAR SWEEP CIRCUIT

Filed March 7, 1963

United States Patent Office 3,176,162

Patented Mar. 30, 1965

3,176,162

HIGH-SPEED LINEAR SWEEP CIRCUIT

Masao Kawashima and Maroshi Hoshino, Yokohama-shi, Japan, assignors to Fujitsu Limited, Kawasaki, Japan, a corporation of Japan Filed Mar. 7, 1963, Ser. No. 263,467
4 Claims. (Cl. 307—88.5)

This invention relates to linear sweep circuits capable of high speed and high repetition rates and particularly to sweep circuits of the bootstrap type.

Known bootstrap circuits operate by charging a sweep capacitor through a resistor which forms an RC-circuit therewith, and correcting the non-linear exponential charging voltage which prevails across the sweep capacitor. In particular, the increasing voltage across the charging sweep capacitor is sensed by an amplifier, preferably an emitter-follower type amplifier, and is applied across the entire RC-circuit by means of a feedback capacitor. The latter increases the potential across the RC-circuit in step with the rising voltage across the sweep capacitor, thereby forcing the sweep capacitor to continue charging at its initial charge rate. The voltage across the charging resistor then is comparatively constant and the voltage change across the sweep capacitor is comparatively linear.

While known boostrap circuits improve sweep linearity, the latter depends upon the capacitance of the feedback capacitor being sufficiently high. However, the feedback capacitor must be recharged between sweep cycles and its charging rate is dependent partly upon the value of its capacitance. Thus improving the sweep linearity by increasing the capacitance of the feedback capacitor merely results in an increase of the necessary time delay between sweep cycles, thereby reducing the available repetition rate of the device or it results in a sweep time less than specified. For the above reasons, in existing bootstrap circuits the attainable linearity and repetition rate are limited by each other.

It is an object of the present invention to improve the linearity of the charging rate and hence the output of bootstrap circuits while nevertheless permitting a high repetition rate for individual sweeps, particularly sweeps of specified time duration and amplitude.

According to a feature of our invention we charge the feedback capacitor of a bootstrap sweep circuit by means of a separate low-impedance switch connected to the input signals initiating the sweep cycles rather than permitting the feedback capacitor to be charged, as they normally are, by the higher associated resistances of the amplifier which slow the charge time of this capacitor.

Figure 1:
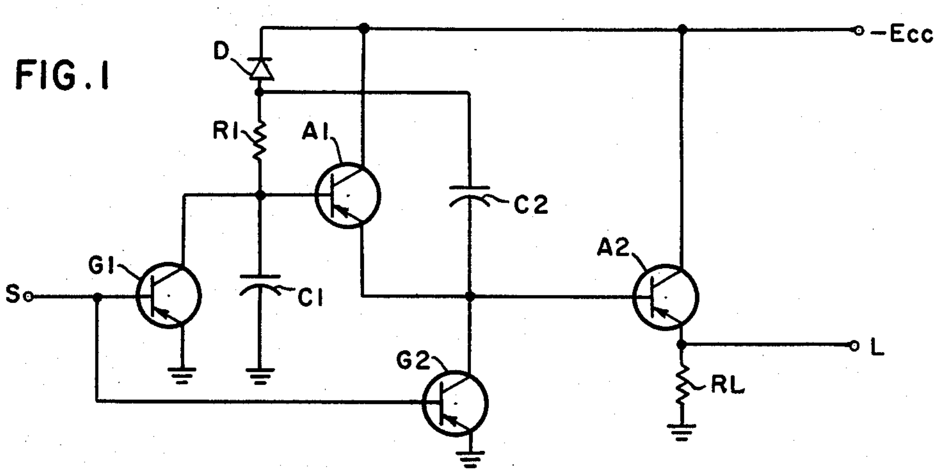
Figure 2:
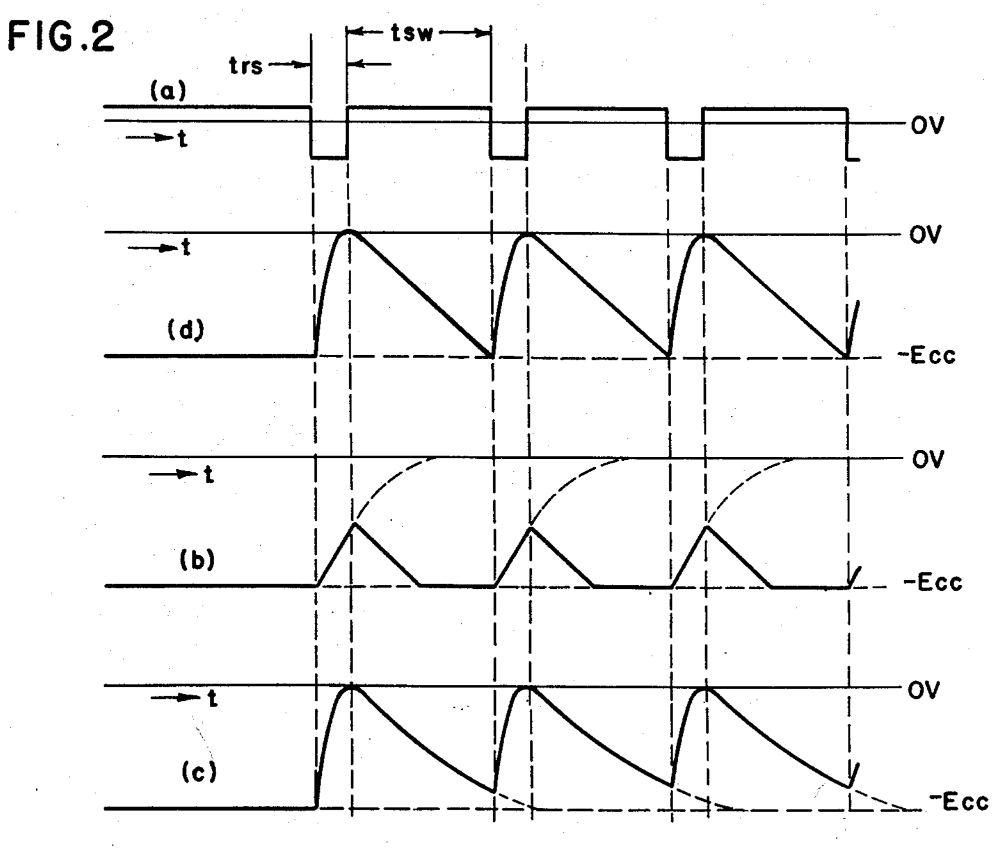

The various features of novelty characterizing the invention are pointed out in the claims forming a part of this specification. For a more complete understanding of the invention, its other objects and advantages, reference may be had to the following description when read in light of the drawings wherein:

FIG. 1 is a bootstrap circuit embodying features of the present invention, and FIG. 2 is a series of time-voltage curves *a*, *b*, *c*, and *d* of various portions of the circuit in FIG. 1.

In FIG. 1 a sweep capacitor C1 is shunted by a switching transistor G1 which is open when a zero or positive voltage is applied to its base by an input terminal S. A charging resistor R1, connected to a voltage source —E*cc* by means of a clamping diode D, charges the capacitor C1 when the switching transistor G1 is nonconductive. The base of a transistor amplifier A1 senses the voltage at the upper plate of capacitor C1 . The collector of amplifier A1 is connected to the voltage source —E*cc* in emitter-follower fashion. The emitter output of the amplifier A1 is connected by a feedback capacitor C2 to the junction of resistor R1 and diode D so that the voltage across the capacitor C1 is fed back to the resistor R1 by means of the capacitor C2. A transistor emitter-follower amplifier A2 having an emitter resistor RL provides a high impedance output for the voltage at the emitter of amplifier A1, which voltage corresponds to the voltage across capacitor C1. An output terminal L connects to the emitter of transistor A2. Connecting the input terminal S to the emitter of amplifier A1 is an emitter-grounded switching transistor G2. The latter charges the capacitor C2 when a negative signal is applied to the terminal S.

Assuming that the transistor G2 is disconnected the circuit operates as follows. When an input signal corresponding to that shown in FIG. 2*a* is applied to the terminal S, the sweep output depicted in FIG. 2*c* appears at the terminal L. Before the onset of the first negative pulse at terminal S, the switching transistor G1 is nonconductive and capacitor C1 has been charged to the to the lever —E*cc* through the resistor R1 and diode D. Thus transistor A1 having its base at a negative level is normally conductive thereby applying to the capacitor C2 by means of its emitter a negative voltage approaching —E*cc*. Amplifier A1 is thus normally conductive. Similarly, amplifier A2 is normally conductive producing an output at the terminal L having the approximate value —E*cc*. At the onset of the first negative pulse the switch G1 becomes conductive thereby shunting and discharging the capacitor C1. This renders the amplifier A1 less conductive so as to make its emitter potential more positive thereby charging capacitor C2 through diode D to the level —E*cc*. This occurs during the interval marked *trs* in FIG. 2*a* and is shown in FIG. 2*c*.

At the end of pulse *trs* the voltage at terminal S returns to its initial value thereby rendering switch G2 non-conductive. The capacitor C1 is now free to charge again at a rate determined by the resistances of resistor R1 and the forward resistance of diode D as well as the voltage —E*cc*. At the first instance of charging the voltage change at capacitor C1 is amplified by transistor A1 and fed back to the junction of resistor R1 and diode D by the capacitor C2. Since the capacitor upper plate of capacitor C1 has then become more negative, the voltage at resistor R1 also becomes more negative, the amplifier A1 and capacitor C2 constituting a positive feedback. The more negative voltage at resistor R1 will not cause a current leak through the diode D because of its high inverse resistance. The higher voltage at resistor R1 maintains the rapidity of the initial charge rate so that the next increment of charge of capacitor C1 is just as rapid thereby producing an even more negative potential at resistor R1 and diode D. This feedback process continues as shown in FIG. 2*c* for the time *tsw*. The charge of capacitor C1 and the output sweep cycle are specified to end at the onset of the next pulse *trs*. The linearity of the charge rate at capacitor C1, and hence the linearity of the voltage at the base and emitter of amplifier A2, is improved because the capacitor C2 tends to maintain constant the voltage across resistor R1.

The linearity of the output depends to a large extent on the capacitor C2 having a comparatively high value. However, if the capacitance of condenser C2 is increased, its charge rate through the associated resistances during the pulse *trs* will be slowed. The effect of such an increase is shown in FIG. 2*b*. It will be seen that the linearity of the sweep is markedly improved. However, the length and voltage variation of the sweep is also decreased below that specified.

According to the invention, we overcome this disadvantage by connecting an electronic switch G2 between the terminal S and the emitter of amplifier A1. Thus, at the pulse *trs*, while capacitor C1 is discharging, the capacitor C2 is connected to ground by a transistor switch G2. The charge time of capacitor C1 is considerably decreased, thus permitting the use of high capacitance to improve linearity without the detrimental effects usually associated therewith.

Now, despite a high capacitance C2 the capacitor C2 charges rapidly during the pulse *trs*. At the end of pulse *trs* and beginning of the sweep cycle *tsw* switch G2 is opened and the increased capacitance C2 provides the linear sweep shown in FIG. 2*d*.

During the sweep time, the emitter voltage of the transistor A1 reaches a point corresponding to the charging voltage of the capacitor C1, the diode D is blocked, and the charge in the capacitor C2 is discharged through the resistor R1 and charges the capacitor C1.

The diode D is connected with its cathode connected to the voltage source —E*cc* and with its anode connected to the resistor R1 and to the capacitor C2. The diode D functions to charge the capacitor C2 to —E*cc* during the time that the switch G2 is conductive.

When the switch G2 is non-conductive, the diode D is blocked, due to the emitter voltage of the transistor A1 becoming negative, and the capacitor C2 discharges through the resistor R1 to charge the capacitor C1.

While an embodiment of the invention has been shown in detail, it will be obvious to those skilled in the art that the invention may be practiced otherwise without departing from its scope and spirit.

We claim:

1. A high speed linear sweep circuit, comprising a sweep capacitor, first switch means connected across said sweep capacitor for discharging said sweep capacitor and for permitting said sweep capacitor to charge through said first switch means, a charging resistor connected to said sweep capacitor, amplifier means having an input connected to said sweep capacitor and an output and responding to the voltage across said sweep capacitor, a voltage source, a clamp diode connected to said charging resistor and adapted to connect said charging resistor to said voltage source, a clamp capacitor connecting the junction of said diode and said charging resistor to the output of said amplifier means, and second switch means responsive to an input signal for charging said clamp capacitor during discharge of said sweep capacitor, said second switch means being connected from the input of said first switch means to the output of said amplifier means.

2. A high speed linear sweep circuit as claimed in claim 1, wherein each of said first and second switch means comprises a transistor.

3. A high speed linear sweep circuit, comprising a sweep capacitor, a first transistor having emitter, collector and base electrodes and being adapted to be switched to one of a non-conducting condition and a conducting condition, means for applying input signals to the base electrode of said first transistor, means connecting said first transistor across said sweep capacitor for discharging said sweep capacitor and for permitting said sweep capacitor to charge in response to said input signals, a charging resistor connected to said sweep capacitor, amplifier means having an input connected to said sweep capacitor and an output and responding to the voltage across said sweep capacitor, a voltage source, a clamp diode connected to said charging resistor and adapted to connect said charging resistor to said voltage source, a clamp capacitor connecting the junction of said diode and said charging resistor to the output of said amplifier means, a second transistor having emitter, collector and base electrodes and being adapted to be switched to one of a non-conducting condition and a conducting condition, means connecting the base electrode of said second transistor to the base electrode of said first transistor, and means connecting the collector electrode of said second transistor to the output of said amplifier means, said second transistor being responsive to said input signals for charging said clamp capacitor during discharge of said sweep capacitor.

esCltnoflcy

4. A high speed linear sweep circuit as claimed in claim 3, wherein said amplifier means comprises a third transistor having emitter, collector and base electrodes, the base electrode of said third transistor being connected to said sweep capacitor, the emitter electrode of said third transistor being connected to the collector electrode of said second transistor, and the collector electrode of said third transistor being connected to said voltage source.

References Cited by the Examiner

UNITED STATES PATENTS

| | | | |
|---|---|---|---|
| 2,915,650 | 12/59 | Williams | 307—88.5 |

ARTHUR GAUSS, *Primary Examiner*.